(12) United States Patent
Mizushima et al.

(10) Patent No.: US 7,905,944 B2
(45) Date of Patent: Mar. 15, 2011

(54) REMOVING METHOD AND APPARATUS FOR HIGH-MELTING POINT COMPOUND, SOLVENT RECOVERING METHOD AND SOLVENT RECOVERING APPARATUS

(75) Inventors: Yasuhiro Mizushima, Kanagawa (JP); Satoshi Sakamaki, Kanagawa (JP)

(73) Assignee: FUJIFILM Corporation, Tokyo (JP)

(*) Notice: Subject to any disclaimer, the term of this patent is extended or adjusted under 35 U.S.C. 154(b) by 562 days.

(21) Appl. No.: 11/863,594

(22) Filed: Sep. 28, 2007

(65) Prior Publication Data
US 2008/0078293 A1    Apr. 3, 2008

(30) Foreign Application Priority Data

Sep. 28, 2006 (JP) ................. 2006-263938
Feb. 6, 2007 (JP) ................. 2007-026282

(51) Int. Cl.
*B01D 47/00* (2006.01)
(52) U.S. Cl. .......................... 95/237; 95/228
(58) Field of Classification Search .............. 95/149, 95/237, 228, 229, 227; 423/210; 55/428; 96/243; 210/150, 188, 702, 749
See application file for complete search history.

(56) References Cited

U.S. PATENT DOCUMENTS
6,280,696 B1 * 8/2001 Hsu et al. ............... 423/245.1

FOREIGN PATENT DOCUMENTS
JP        2003-165866 A      6/2003

* cited by examiner

*Primary Examiner* — Duane Smith
*Assistant Examiner* — Thomas Bennett McKenzie
(74) *Attorney, Agent, or Firm* — Sughrue Mion, PLLC (57) ABSTRACT

A reducing agent removal line comprises a heat exchanger, an air supply line and a cleaning liquid supply line. The cleaning liquid supply line feeds cleaning liquid into a first passage chamber. The air supply line supplies mixed air of after-drying air containing high-melting point additive and additive containing air containing low-melting point additive into the first passage chamber. Due to contact between the mixed air and a heat-exchanging element, a mixture material containing the high-melting point additive is precipitated from the mixed air. Since melting point MP1 of the high-melting point additive in the mixed air can be controlled to be lower than a temperature of the cleaning liquid by changing a mixture ratio M, the cleaning liquid contacts and dissolves the mixture material in the mixed air.

8 Claims, 4 Drawing Sheets

REMOVING METHOD AND APPARATUS FOR HIGH-MELTING POINT COMPOUND, SOLVENT RECOVERING METHOD AND SOLVENT RECOVERING APPARATUS

BACKGROUND OF THE INVENTION

1. Field of the Invention

The present invention relates to a removing method and an apparatus for high-melting point compound, a solvent recovering method and a solvent recovering apparatus. Especially, the present invention relates to a removing method and an apparatus for high-melting point compound, a solvent recovering method and a solvent recovering apparatus in each of which the high-melting point compound is contained in washing waste liquid in a solvent removal line used for solution casting method.

2. Description of the Related Arts

A polymer film (hereinafter called as the film) has superior optical transparency and flexibility, and allows reduction in thickness and weight thereof. Accordingly, the polymer film is used as various optical functional films. Especially, a cellulose ester film such as a cellulose acylate film is used as a protective film of a polarizing plate of a liquid crystal display (LCD), an optical compensation film, an anti-reflection film, a wide view film and the like, because of having toughness, low birefringence, low retardation and low cost.

As methods for producing the film, there are a melt extrusion method and a solution casting method. The melt extrusion method has an advantage in high productivity and low cost for a production apparatus, because polymers are melted and then extruded from an extruder to produce the film. However, in this method, accuracy of the film thickness is low, and minute streaks (die lines) are generated on the film. Accordingly, it is difficult to produce the film with high quality sufficient to be used as the optical functional film. In contrast, in the solution casting method, polymers are dissolved to a solvent to prepare a polymer solution (dope), and the dope is cast on a moving support to form a casting film. After having a self-supporting property, the casting film is peeled from the support as a wet film, and dried so as to become a film. The film produced in this method is more excellent in optical isotropy and uniformity of thickness and has less foreign particles than that obtained in the melt extrusion method. For above reasons, most of the optical functional films are produced by the solution casting method.

In the solution casting method, a polymer solution (hereinafter referred to a dope) is prepared by dissolving a polymer such as cellulose triacetate in a solvent mixture containing dichloromethane, methyl acetate, or the like as a main solvent. Certain additives are mixed into the dope to prepare a casting dope. The casting dope is cast from a casting die onto a support such as a casting drum, an endless belt, or the like to form the casting film (hereinafter referred as a casting process). The casting dope between the casting die and the support is referred to as a casting bead. The casting film is dried and cooled on the support to obtain the self supporting property. Thereafter, the casting film is peeled off from the support as a wet film. The wet film is dried to obtain the film (hereinafter referred as a drying process). Finally, the film is wound up into a roll.

In the drying process, the solvent contained in the wet film is vaporized in a drying chamber. To constantly keep performance of vaporizing the solvent in atmosphere inside the drying chamber, the gaseous solvent contained in the atmosphere inside the drying chamber needs to be recovered regularly.

Triphenyl phosphate (TPP), which is a representative additive for a cellulose triacetate film, works as a plasticizer for applying flame retardancy, transparency, waterproofness and nonadhesive property to the film. Although the TPP has a high boiling point (399° C.), a part thereof is evaporated with the solvent during the drying process. Accordingly, in a cooling process in the solvent removal line, a precipitation of the TPP is generated with liquefied solvent. The precipitation of TPP in the solvent removal line possibly sticks to a cooling device and pipes used for the cooling process, which causes deterioration of processing performance of the solvent removal line. In consideration of this problem, Japanese Patent Laid-Open Publication No. 2003-165866 uses a cleaning line in addition to the solvent removal line. The cleaning line regularly cleans the cooling device and pipes with use of hot water or the like so that the additive precipitated on solvent removal line can be removed.

By the way, although retardation value of the cellulose ester film is low in the plastic films, it is still considerably higher than that of other optical materials such as inorganic glasses (for example a silica glass). Accordingly, manufacturers of liquid crystal display devices have longed for further reduction of the retardation of the polymer film as the optical functional film. By a keen examination, the inventors and the applicant found that a film with extremely low retardation is obtained when a specific compound is added to dope used for the solution casting method.

However, when the dope including this specific compound (hereinafter called as retardation reducing agent) is used for the solution casting method, gas containing the retardation reducing agent evaporated with the solvent in the drying chamber is recovered in the solvent removal line. In this process, the retardation reducing agent is precipitated in a heat exchanger in the solvent removal line. The precipitation possibly clogs pipes and filters in the solvent removal line. To remove the precipitation, cleaning liquid or the like need to be used. As the cleaning liquid, water is preferably used for easy handling. However, since the melting point of the retardation reducing agent is higher than the boiling point of the water, the hot water cannot remove the precipitation. Accordingly, to melt the precipitation, heated wind of at least 100° C. is used. When the heated wind is fed into the heat exchanger including pipes where cooling water and so on also flow, the solvent removal line needs to be temporary stopped to prevent breakage of the pipes. Therefore, in this method, production efficiency of the film is reduced and production cost of the film is increased.

SUMMARY OF THE INVENTION

An object of the present invention is to provide a removing method and a removing apparatus for high-melting point additive used for producing a film with low retardation, and a solvent recovering method and solvent recovering apparatus.

In order to achieve the above and other objects, a removing method of the present invention for high-melting point compound comprises following steps. At first, a cleaning liquid having a temperature lower than a melting point MP1 of a high-melting point compound and higher than a melting point MP2 of a low-melting point compound is prepared. Then the cleaning liquid is contacted to the high-melting point compound in a gas in which compounds having different melting points are mixed.

It is preferable that a mixture ratio of the low-melting point compound included in the gas is in a range of 30 wt. % to 50 wt. %. It is preferable that the gas is mixture of after-drying air and air including the low-melting point compound, the after-drying air being generated by drying a wet film including a polymer which is a material of the film, solvent which dissolves the polymer, and the high-melting point compound, and that the high-melting point compound is a precipitation precipitated by cooling of the after-drying air or the gas.

It is preferable that the cleaning liquid is water. It is preferable that the high-melting point compound is a retardation reducing agent for reducing a retardation of the film. Further, it is preferable that the high-melting point compound is n-phenyl-p-toluenesulfonamide, and that the low-melting point compound is diphenoxy phosphoryl oxybenzene, bis(2-Ethylhexyl)phthalate, cresyl diphenyl phosphate, or biphenyl diphenyl phosphate.

A solvent recovering method of the present invention comprises following steps. At first, the high-melting point compound is removed by the removing method described above. Then residual air after the contact is cooled to remove the low-melting point compound. Finally, an absorbing process is applied to residual air after the cooling to recover the solvent. It is preferable that the residual air after the solvent recovering is used as before-drying air for drying the wet film.

An apparatus of the present invention for removing high-melting point compound comprises a contacting device which makes contact between a high-melting point compound and a cleaning liquid having a temperature lower than a melting point MP1 of the high-melting point compound and higher than a melting point MP2 of a low-melting point compound in a gas in which compounds having different melting points are mixed.

It is preferable that the apparatus further comprises a mixing device which makes the gas in which mixture ratio of the low-melting point compound is in a range of 30 wt. % to 50 wt. %. In addition, it is preferable that the apparatus further comprises a gas recovering device, a mixing device and a cooling device. The gas recovering device recovers after-drying air containing solvent and the high-melting point compound, the after-drying air being generated by drying a wet film including a polymer which is a material of the film, the solvent which dissolves the polymer, and the high-melting point compound. The mixing device mixes air including the low-melting point compound and the after-drying air to make the gas. The cooling device cools the after-drying air or the gas to precipitate the high-melting point compound. It is preferable that the cleaning liquid is water.

An solvent recovering apparatus of the present invention comprises the apparatus described above for removing high-melting point compound, a cooling device for cooling residual air after the contact to remove the low-melting point compound, and an absorbing device for applying absorbing process to residual air after the cooling to recover the solvent.

According to the removing method of the present invention for high-melting point compound, since the cleaning liquid contacts the high-melting point compound in the gas in which compounds having different melting points are mixed, the precipitation including the high-melting point compound such as the retardation reducing agent can be easily removed at a temperature lower than the melting point of the high-melting point compound. Therefore, energy amount for removing the precipitation can be reduced.

In addition, according to the solvent recovering method of the present invention, since the residual air after the contact is cooled to remove the low-melting point compound, and then the absorbing process is applied to residual air after the cooling to recover the solvent, the precipitation can be removed without stopping the solvent removal line. Therefore, cost for performing the solvent recovering method can be reduced, and the production cost for the film with low retardation can be reduced.

BRIEF DESCRIPTION OF THE DRAWINGS

The above and other subjects and advantages of the present invention will become apparent from the following detailed description of the preferred embodiments when read in association with the accompanying drawings, which are given by way of illustration only and thus are not limiting the present invention. In the drawings, like reference numerals designate like or corresponding parts throughout the several views, and wherein.

DETAILED DESCRIPTION OF THE PREFERRED EMBODIMENTS

In the following, embodiments of the present invention will be explained in detail. However, the present invention is not limited to these embodiments.

[Polymer]

In this embodiment, cellulose acylate is used as a polymer. In particular, cellulose triacetate (TAC) is especially preferable. In the cellulose acylate to be used in the present invention, a degree of substitution of hydroxyl group preferably satisfies all of the following formulae (1)-(3).

$$2.5 \leq A+B \leq 3.0 \tag{1}$$

$$0 \leq A \leq 3.0 \tag{2}$$

$$0 \leq B \leq 2.9 \tag{3}$$

In these formulae (1) to (3), A is the degree of substitution of the hydrogen atom of the hydroxyl group for the acetyl group, and B is a degree of substitution of the hydroxyl group for the acyl group with 3-22 carbon atoms. Preferably, at least 90 wt. % of the TAC particles have a diameter from 0.1 mm to 4 mm. However, the polymer used in the present invention is not limited to the cellulose acylate.

The cellulose is constructed of glucose units making β-1,4 combination, and each glucose unit has a free hydroxyl group at second, third and sixth positions. Cellulose acylate is a polymer in which a part of or the entire of the hydroxyl groups are esterified so that the hydrogen is substituted by acyl group with two or more carbons. The degree of substitution for the acyl groups in cellulose acylate is a degree of esterification of the hydroxyl group at second, third or sixth position in cellulose. Accordingly, when all (100%) of the hydroxyl group at the same position are substituted, the degree of substitution at this position is 1.

When the degrees of substitution of the acyl groups for the hydroxyl group at the second, third or sixth positions are respectively described as DS2, DS3 and DS6, the total degree of substitution of the acyl groups for the hydroxyl group at the second, third and sixth positions (namely DS2+DS3+DS6) is preferably in the range of 2.00 to 3.00, particularly in the range of 2.22 to 2.90, and especially in the range of 2.40 to 2.88. Further, DS6/(DS2+DS3+DS6) is preferably at least 0.28, and more preferably 0.30, and especially preferably in the range of 0.31 to 0.34.

One or more sorts of acyl group may be contained in the cellulose acylate of the present invention. When two or more sorts of the acyl groups are used, it is preferable that one of the sorts is acetyl group. If the total degree of substitution of the acetyl groups for the hydroxyl group and that of acyl groups other than the acetyl group for the hydroxyl group at the second, third or sixth positions are respectively described as DSA and DSB, the value DSA+DSB is preferably in the range of 2.22 to 2.90, and especially preferably in the range of 2.40 to 2.88. Further, the DSB is at least 0.30% and especially at least 0.7. Further, in DSB, the percentage of the substituent for the hydroxyl group at the sixth position is at least 20%, preferably at least 25%, especially at least 30% and most especially at least 33%. Further, the degree of the acyl groups at sixth position is at least 0.75, particularly at least 0.80, and especially preferable to be 0.85. By cellulose acylate satisfying the above conditions, a solution (or dope) having excellent dissolubility can be prepared. Especially when non-chlorine type organic solvent is used, the adequate dope with a low viscosity and a high filterability can be prepared.

The cellulose acylate can be obtained from cotton linter or pulp.

The acyl group having at least 2 carbon atoms may be aliphatic group or aryl group, and is not especially restricted. As examples of the cellulose acylate, there are alkylcarbonyl ester, alkenylcarbonyl ester, aromatic carbonyl ester, aromatic alkylcarbonyl ester and the like. Further, the cellulose acylate may be also esters having other substituents. The preferable substituents are propionyl group, butanoyl group, pentanoyl group, hexanoyl group, octanoyl group, decanoyl group, dodecanoyl group, tridecanoyl group, tetradecanoyl group, hexadecanoyl group, octadecanoyl group, iso-butanoyl group, t-butanoyl group, cyclohexane carbonyl group, oleoyl group, benzoyl group, naphtylcarbonyl group, cinnamoyl group and the like. Among them, propionyl group, butanoyl group, dodecanoyl group, octadecanoyl group, t-butanoyl group, oleoyl group, benzoyl group, naphtyl carbonyl group, cinnamoyl group and the like are particularly preferable, and propionyl group and butanoyl group are especially preferable.

[Solvent]

Solvent compounds for preparing the dope are aromatic hydrocarbon (for example, benzene toluene and the like), halogenated hydrocarbons (for example, dichloromethane, chlorobenzene and the like), alcohols (for example methanol, ethanol, n-propanol, n-butanol, diethylene glycol and the like), ketones (for example acetone, methylethyl ketone and the like), esters (for example, methylacetate, ethylacetate, propylacetate and the like), ethers (for example tetrahydrofuran, methylcellosolve and the like) and the like. In this invention, the dope refers to a polymer solution or a polymer dispersion obtained by dissolving or dispersing a polymer in a solvent.

The preferable solvent compounds are the halogenated hydrocarbons having 1 to 7 carbon atoms, and dichloromethane is especially preferable. In view of physical properties such as a solubility of TAC, a peelability of a casting film from a support, a mechanical strength, optical properties of the film and the like, it is preferable to mix at least one sort of the alcohol having 1 to 5 carbon atoms into the halogenated hydrocarbons. The content of the alcohols is preferably in the range of 2 wt. % to 25 wt. %, and especially in the range of 5 wt. % to 20 wt. % of total solvent compounds in the solvent. As concrete example of the alcohols, there are methanol, ethanol, n-propanol, isopropanol, n-butanol, and the like. It is preferable to use methanol, ethanol, n-butanol or a mixture thereof.

Recently, in order to reduce the influence on the environment, the solvent containing no dichloromethane is proposed. In this case, the solvent contains ether with 4 to 12 carbon atoms, ketone with 3 to 12 carbon atoms, ester with 3 to 12 carbon atoms, alcohol with 1 to 12 carbon atoms, or a mixture of them. For instance, a solvent mixture of methyl acetate, acetone, ethanol, and n-butanol can be used. The ether, ketone, ester, and alcohol may have a cyclic structure. A compound having two or more functional groups of the ether, ketone, ester, and alcohol (that is, —O—, —CO—, —COO—, and —OH—) can be used as the solvent.

In the dope, additives such as a retardation reducing agent described below can be added. Next, these additives are described in detail.

[Peeling Accelerators]

Preferably, a peeling accelerator is blended in order to reduce load applied in peeling the film. Examples of peeling accelerators include surface active agents of any type which may be phosphates, sulfonates, carboxylic acid compounds, nonion materials, cation materials or the like. Those are suggested in Japanese Patent Laid-Open Publications No. 61-243837 and No. 1-299847.

In relation to the peeling accelerators, United States Patent Publication No. 2004/0188881 (corresponding to Japanese Patent Laid-Open Publication No. 2003-055501) discloses cellulose acylate solutions of which a solvent is chlorine-free, and which contain an additive selected from partly esterified poly-basic acids, salts of alkaline earth metals, and salts of alkaline metals, wherein the partly esterified poly-basic acids show acid dissociation index (pKa) values of 1.93-4.5 when dissolved in water. This is for the purpose of preventing a cloudy state in the cellulose acylate solutions, and obtaining high suitability for peeling in film production and high quality of film surfaces.

Japanese Patent Laid-Open Publication No. 2003-103545 discloses production of a cellulose acylate film improved in separability in peeling at the time of production and film surface properties, and having no problem in durability. In the method of manufacturing the cellulose acylate film by casting two or more layers by a multi casting method, additives A and B are used. The additive A is selected from a partial ester of a polybasic acid of which the acid dissociation index (pKa) in an aqueous solution is 1.93-4.50, an alkali metal salt thereof, and an alkaline earth metal salt thereof, and is added to a solution prepared by dissolving cellulose acylate in a solvent substantially constituted of a chlorine-free solvent and constituting either one of two or more layers. The additive B is a selected one of an amine compound with pKa of 4.50 or more, and an amine compound having substantially no volatility and having a molecular weight of 200 or less per one basic group is added to the solution constituting at least one layer containing no additive A. Note that examples of peeling accelerators usable in the invention include citric acid, citrate esters and the like. As described later, only one of plural dopes directly contacting a support in the course of multi casting should preferably contain the peeling accelerator, which facilitates peeling of a casting film without deteriorating optical performance.

A peeling accelerator can be contained at an amount equal to or more than $1 \times 10^{-4}$ wt. % and equal to or less than 1.0 wt. % in 100 wt. % of polymer in the polymer film. If the amount of the peeling accelerator is less than $1 \times 10^{-4}$ wt. %, the effect of improving the peeling property of the polymer film will be insufficient. If the amount of the peeling accelerator be more than 1 wt. %, optical performance of the polymer film will be degraded.

[Plasticizers]

Phosphate esters and carboxylic acid esters are preferable. Specifically preferable examples are as follows:

triphenyl phosphate (TPP), tricresyl phosphate (TCP), cresyl diphenyl phosphate, octyl diphenyl phosphate, diphenyl biphenyl phosphate, trioctyl phosphate, tributyl phosphate, dimethyl phthalate (DMP), diethyl phthalate (DEP), dibutyl phthalate (DBP), dioctyl phthalate (DOP), diphenyl phthalate (DPP), and diethyl hexyl phthalate (DEHP), O-acetyl citric acid triethyl ester (OACTE), O-acetyl citric acid tributyl ester (OACTB), acetyl triethyl citrate, acetyl tributyl citrate, butyl oleate, methyl acetyl ricinolate, dibutyl sebacate, triacetin, tributylin, butyl phthalyl butyl glycolate, ethyl phthalyl ethyl glycolate, methyl phthalyl ethyl glycolate, and butyl phthalyl butyl glycolate. Also, preferable plasticizers are (di)penta erythritol esters, glycerol esters, and diglycerol esters.

[UV Absorbers]

In the cellulose acylate film, one or more UV absorbers are preferably contained. Since having the dimensional stability, the cellulose acylate film is used in the polarizing filter, the liquid crystal display and the like. In view of the protection of the deterioration of them, the UV absorber is preferably excellent in absorbing UV rays of which a wavelength is equal to or less than 370 nm. Further, in view of the display performance of the LCD, the UV absorber preferably does not absorb visible rays of which a wavelength is equal to or more than 400 nm. Examples of UV absorbers are oxybenzophenone compounds, benzotriazol compounds, salicylate ester compounds, benzophenone compounds, cyanoacrylate compounds, and nickel complex salt compounds.

Specifically preferable examples of benzotriazol UV absorbers are follows:
2-(2'-hydroxy-5'-methylphenyl) benzotriazol; 2-(2'-hydroxy-3',5'-di-tert-butylphenyl) benzotriazol; 2-(2'-hydroxy-3'-tert-butyl-5'-methylphenyl) benzotriazol; 2-(2'-hydroxy-3',5'-di-tert-butylphenyl)-5-chlorobenzotriazol; 2-(2'-hydroxy-3'-(3",4",5",6"-tetrahydrophthalimidomethyl)-5'-methylphenyl) benzotriazol; 2,2-methylene bis (4-(1,1,3,3-tetramethylbutyl)-6-(2H-benzotriazol-2-yl) phenol); 2-(2'-hydroxy-3'-tert-butyl-5'-methylphenyl)-5-chlorobenzotriazol; 2,4-dihydroxybenzophenone; 2,2'-dihydroxy-4-methoxybenzophenone; 2-hydroxy-4-methoxy-5-sulfobenzophenone; bis(2-methoxy-4-hydroxy-5-benzoylphenylmethane); (2,4-bis-(n-octylthio)-6-(4-hydroxy-3,5-di-tert-butylanilino)-1,3,5-triazine; 2-(2'-hydroxy-3',5'-di-tert-butylphenyl)-5-chlorobenzotriazol; 2(2'-hydroxy-3',5'-di-tert-amylphenyl)-5-chlorobenzotriazol; 2,6-di-tert-butyl-p-cresol; pentaerythrityl-tetrakis[3-(3,5-di-tert-butyl-4-hydroxyphenyl)propionate]; triethyleneglycol-bis[3-(3-tert-butyl-5-methyl-4-hydroxyphenyl) propionate]; 1,6-hexanediol-bis[3-(3,5-di-tert-butyl-4-hydroxyphenyl) propionate]; 2,4-bis-(n-octylthio)-6-(4-hydroxy-3,5-di-tert-butylanilino)-1,3,5-triazine; 2,2-thio-diethylene bis[3-(3,5-di-tert-butyl-4-hydroxyphenyl) propionate]; octadecyl-3-(3,5-di-tert-butyl-4-hydroxyphenyl) propionate; N,N'-hexamethylene bis(3,5-di-tert-butyl-4-hydroxy-hydrocinnamide); 1,3,5-trimethyl-2,4,6-tris(3,5-di-tert-butyl-4-hydroxybenzyl) benzene; tris-(3,5-di-tert-butyl-4-hydroxybenzyl)-isocyanurate and the like.

Especially preferable examples are
2,4-bis-(n-octylthio)-6-(4-hydroxy-3,5-di-tert-butylanilino)-1,3,5-triazine; 2(2'-hydroxy-3',5'-di-tert-butylphenyl)-5-chlorobenzotriazol; 2(2'-hydroxy-3',5'-di-tert-amylphenyl)-5-chlorobenzotriazol; 2,6-di-tert-butyl-p-cresol; pentaerythrityl-tetrakis[3-(3,5-di-tert-butyl-4-hydroxyphenyl) propionate]; and triethyleneglycol-bis[3-(3-tert-butyl-5-methyl-4-hydroxyphenyl) propionate].

Further, the following compounds can be used in combination with the above UV absorbers: metal desactivator of hydrazine type, such as N,N'-bis[3-(3,5-di-tert-butyl-4-hydroxyphenyl) propionyl]hydrazine, processing stabilizers of phosphorus type, such as tris(2,4-di-tert-butylphenyl) phosphite and the like.

As the UV absorbers to be used in the present invention, there are optical stabilizer in catalogue of Adekastab, optical stabilizers and UV absorbers in catalogue of Tinuvin of Ciba Specialty Chemicals Inc., and SEESORB, SEENOX, SEETEC and the like in catalogue of Shipro Kasei Kaisha Ltd. Further, other usable additives are UV absorbers and antioxidants marketed by Johoku Chemical Co., Ltd., VIOSORB marketed by Kyodo Chem. Co. Ltd., and UV absorbers marketed by Yoshitomi Pharmaceutical Ind. Ltd.

Further, Japanese Patent Laid-Open publication No. 6-148430 discloses ultraviolet (UV) absorbers which it is preferable to use. The UV absorbers of the document have high transparency and high efficiency for preventing the deterioration of the polarizing filter or the liquid crystal elements. Especially, benzotriazol UV absorbers are preferable owing to reduction of unwanted coloring.

Japanese Patent Laid-Open Publication No. 2003-043259 discloses the optical film to be used in the polarizing filter and the display device. The optical film is excellent in color reproducibility and endurance in the illumination of the UV ray. In the UV wavelength range, the spectral transmittance of the disclosed optical film is 50-95% at 390 nm, and at most 5% at 350 nm.

Benzotriazol compounds, benzophenone compounds and triazine compounds are preferable as ultraviolet (UV) absorbers. An ultraviolet (UV) absorber can be contained at an amount equal to or more than 0.001 wt. % and equal to or less than 5 wt. % in 100 wt. % of polymer in the polymer film, and preferably, at an amount equal to or more than 0.01 wt. % and equal to or less than 3 wt. %, and desirably, at an amount equal to or more than 0.1 wt. % and equal to or less than 2 wt. %. If the amount of the ultraviolet (UV) absorber is less than 0.001 wt. %, prevention of film degradation due to ultraviolet rays will be insufficient. If the amount of the ultraviolet (UV) absorber is more than 5 wt. %, optical performance of the polymer film will be lower.

[Fine Particles]

Fine particles can be preferably added to cellulose acylate film in this embodiment particularly for the purpose of preventing scratches, damages or facilitating transport in the course of the handling. Such fine particles have been widely used as matt agents, anti-blocking agents, and smoothing agents to prevent squeak. Any suitable substances can be used as fine particles for this function. However, specifically preferable examples are as follows.

Various silicon compounds, silica (silicon dioxide), titanium oxide, zinc oxide, aluminum oxide, barium oxide, zirconium oxide, strontium oxide, antimony oxide, tin oxide, tin/antimonyoxide, calcium carbide, talc, clay, sintered kaolin, sintered calcium silicate, hydrated calcium silicate, aluminum silicate, magnesium silicate, and calcium phosphate.

Most preferable examples are inorganic silicon compounds, and zirconium oxide. Among those, silica is particularly acceptable because a cloudy state of the cellulose acylate film can be reduced. Available examples of fine particles of silica include Aerosil R972, R974, R812, 200, 300, R202, OX50 and TT600 (tradenames) manufactured by Nippon Aerosil Co, Ltd. Available examples of fine particles of zirconium oxide include Aerosil R976 and R811 (trade name) manufactured by Nippon Aerosil Co, Ltd.

Examples of preferable organic compounds are polymers including silicone resins, fluorine resins and acrylic resins. Among those, silicone resins are specifically preferable. Preferable available products of silicone resins have a three-dimensional net structure, and can be Tospearl 103, Tospearl 105, Tospearl 108, Tospearl 120, Tospearl 145, Tospearl 3120 and Tospearl 240 (trade name) manufactured by GE Toshiba Silicones Corp.

Fine particles preferable in the invention are silica and titanium oxide, and particularly silica. Fine particles can be contained at an amount equal to or more than 0.001 wt. % and equal to or less than 5 wt. % in 100 wt. % of polymer in the polymer film, and preferably, at an amount equal to or more than 0.1 wt. % and equal to or less than 3 wt. %, and desirably, at an amount equal to or more than 0.5 wt. % and equal to or less than 2 wt. %. If the amount of the fine particles is less than 0.001 wt. %, prevention of sticking between turns of wound polymer film will be insufficient. If the amount of the fine particles is more than 5 wt. %, smoothness of the film surface will be too low.

[Retardation Reducing Agent]

The retardation reducing agent for reducing the retardation of the cellulose ester film preferably has a low melting point. If the melting point is high, it becomes difficult to removing a precipitate formed by cooling of gas including the solvent and additives evaporated in a drying chamber.

As the retardation reducing agent, preferably phenol or 2-(2H-benzotriazol-2-yl)4,6-bis(1,1-dimethylpropyl) is used in the present embodiment because of superior affinity to TAC.

Note that the detailed explanation of cellulose acylate is made from [0140] to [0195] in Japanese Patent Laid-Open Publication No. 2005-104148, and the description of this publication can be applied to the present invention. Note that the detailed explanation of the solvents and the additives (such as plasticizers, deterioration inhibitors, UV-absorptive agents, optical anisotropy controllers, dynes, matting agent, release agent, release accelerator and the like) is made from [0196] to [0516] in Japanese Patent Laid-Open Publication No. 2005-104148.

[Solution Casting Process]

Figure 1:
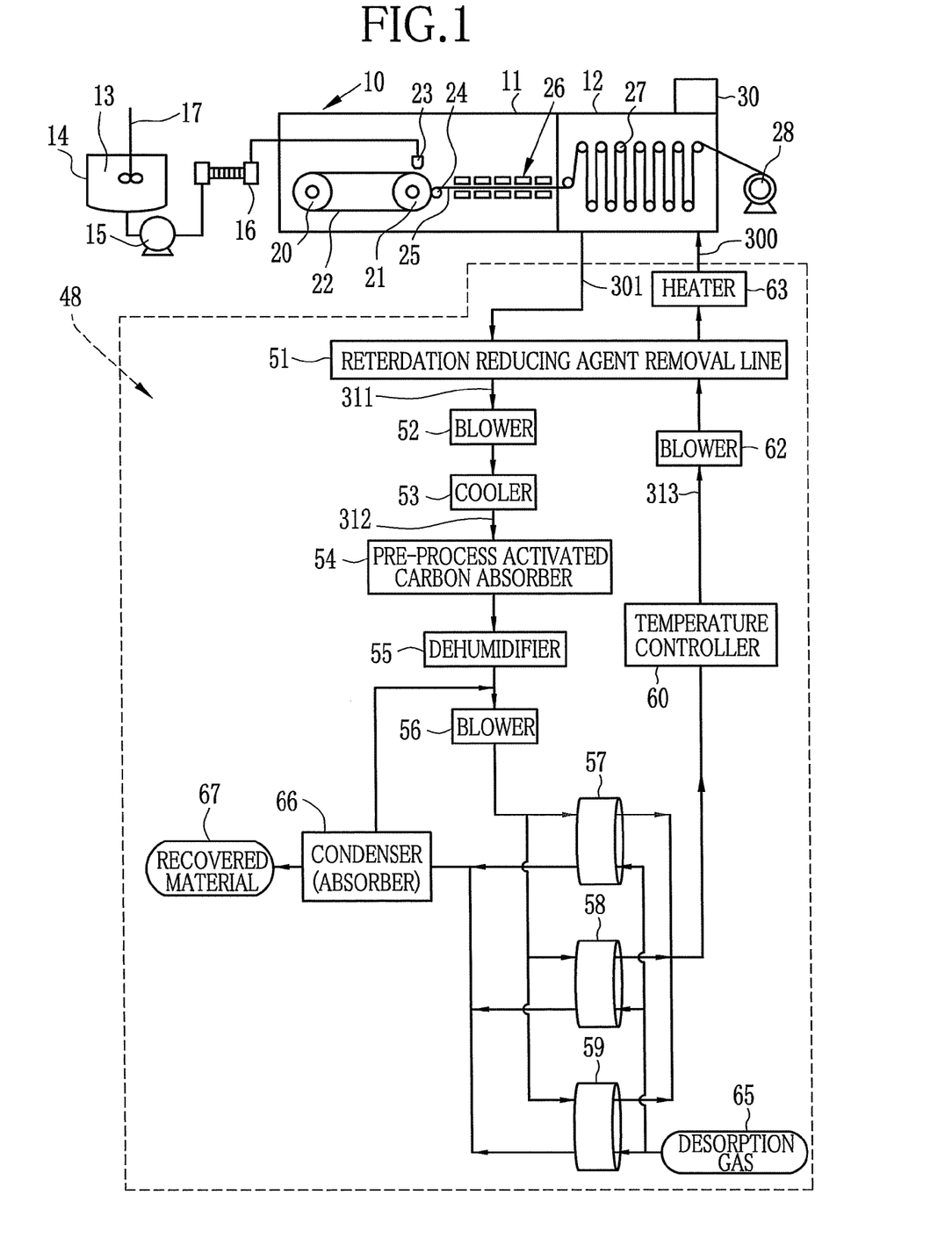
FIG. 1 is a schematic diagram of a film producing line and a solvent removal line.

As shown in FIG. 1, a film producing apparatus 10 includes a band zone 11 and a drying zone 12. A tank 14 for preparing dope 13 is connected to the film producing apparatus 10 through a pump 15 and a filter 16. A stirring rod 17 is attached to the tank 14 for uniformly stirring the dope 13. The dope 13 is the mixture of the polymer and the solvent, in which the polymer is dissolved in the solvent. The dope 13 can contain the additives such as the plasticizer and the UV absorber, in addition the retardation reducing agent. In the present invention, the solvent for the dope 13, the retardation reducing agent and other additives can be recovered from a solvent removal line (described later) and mixed with brand-new one, for reuse. Recovering process will be described later.

[Band Zone]

As shown in FIG. 1, in the band zone 11 there is a casting band 22 hanged between rollers 20 and 21. The casting band 22 is rotated by a driver (not shown). Above the casting band 22, a casting die 23 is provided. The dope 13 is fed to the filter 16 from the tank 14 by the pump 15, and the filter removes impurities in the dope 13. Then the dope 13 without the impurities is fed to the casting die 23. The casting die 23 casts the dope 13 on the casting band 22. The dope 13 is gradually dried while being transported by the casting band 22, and is peeled from the casting band 22 with use of a peeling roller 24. The peeled dope 13 is called as a film 25. The film 25 is stretched to a predetermined width by a tenter 26, and dried while being transported by the tenter 26.

[Drying Zone]

The film 25 fed to the drying zone 12 from the tenter 26 is hanged on a plurality of rollers 27 inside the drying zone 12. A certain drying process is applied to the film 25. The film 25 after the drying process is wound by a winder 28 (winding device).

To the drying zone 12, an air conditioner 30 is connected. The air conditioner 30 maintains drying conditions in predetermined ranges. The drying conditions include temperature and humidity of air inside the drying zone 12 (hereinafter called as the before-drying air 300), density of the solvent and so on. The drying process is preformed by blowing the before-drying air 300 onto the film 25. According to the drying process, the before-drying air 300 absorbs the solvent and so on contained in the film 25 (to be an after-drying air 301).

[Before-Drying Air]

Component of the before-drying air 300 is not limited, and natural air can be used as the before-drying air 300. Although the temperature of the before-drying air 300 is not limited, it is preferable in a range of 50° C. to 160° C. for drying the film 25 uniformly. To effectively perform the drying process in the drying zone 12, the drying condition is preferably controlled such that a density of the solvent removed from the film 25 becomes no more than 1000 ppm in the after-drying air 301.

In the drying zone 12, a blower 32 (see FIG. 3) is provided. The blower 32 has a flow rate controlling device. Accordingly, the after-drying air 301 in the drying zone 12 is fed into the solvent removal line (described later) at a predetermined flow rate. The aim of the drying process for the film 25 is removal of the solvent by accelerating the evaporation of the solvent from the film 25. However in the drying process, part of the retardation reducing agent and other additives is evaporated with the solvent. Therefore, the after-drying air 301 contains also the retardation reducing agent and other additives, in addition with the solvent.

[Solvent Removal Line]

A solvent removal line 48 includes a retardation reducing agent removal line (hereinafter called as the reducing agent removal line) 51, a blower 52, a cooler 53, a pre-process activated carbon absorber 54, a dehumidifier 55, a blower 56, absorption layers 57 to 59, a temperature controller 60, a blower 62 and a heater 63.

[Retardation Reducing Agent Removal Line]

Figure 3:
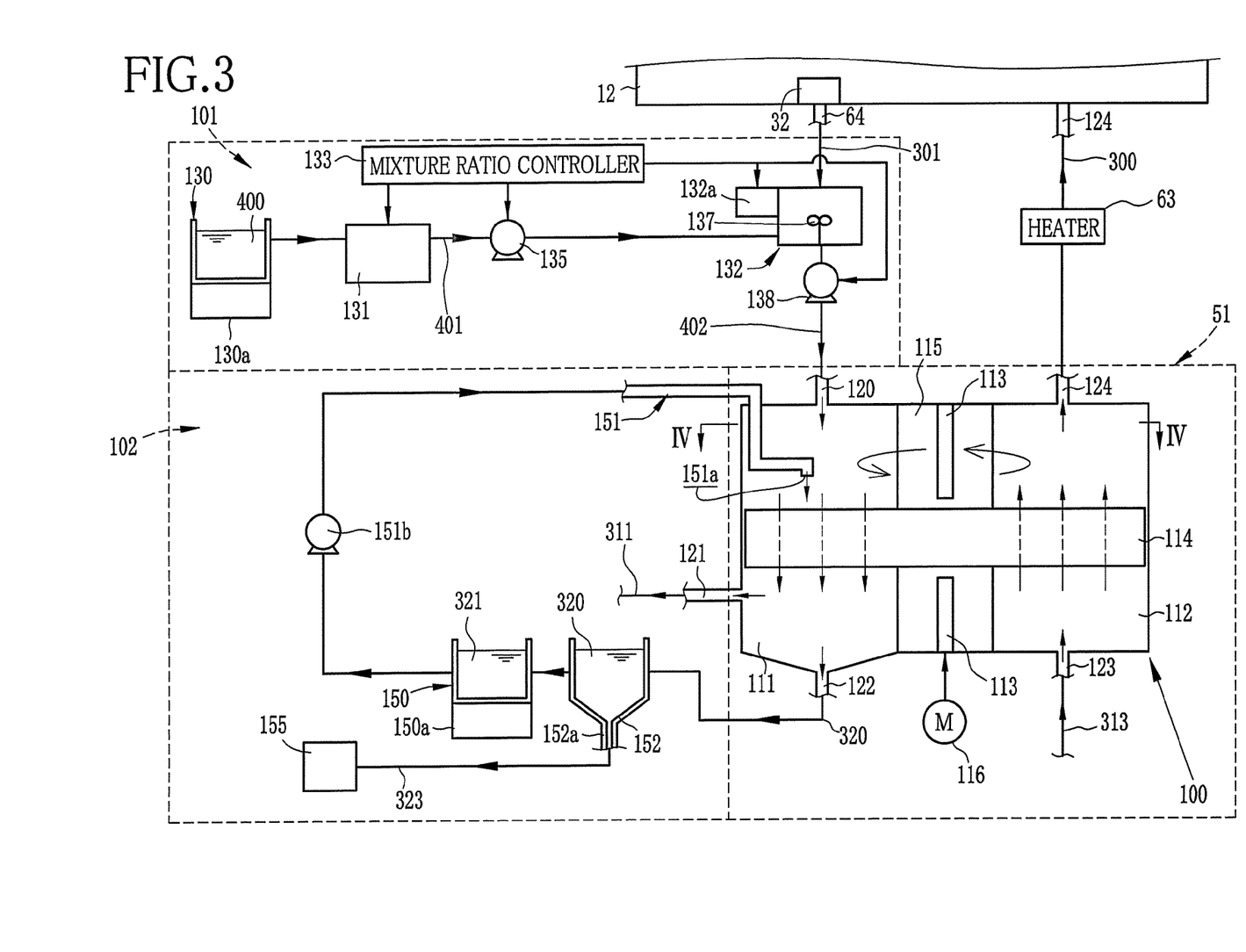
FIG. 3 is a schematic diagram of a retardation reducing agent removal line of the present invention.

The reducing agent removal line 51 is connected to the drying zone 12 through a pipe 64 (see FIG. 3). The after-drying air 301 is fed into the reducing agent removal line 51 from the drying zone 12 by the blower 32 (see FIG. 3). In the reducing agent removal line 51, the retardation reducing agent is removed from the after-drying air 301, to generate first processed air 311. Note that the reducing agent removal line 51 will be described in detail later.

[Blower]

The blower 52 is connected to the reducing agent removal line 51 and the cooler 53, each through a pipe. The blower 52 sends the first processed air 311 from the reducing agent removal line 51 to the cooler 53.

[Cooler]

Figure 2A:
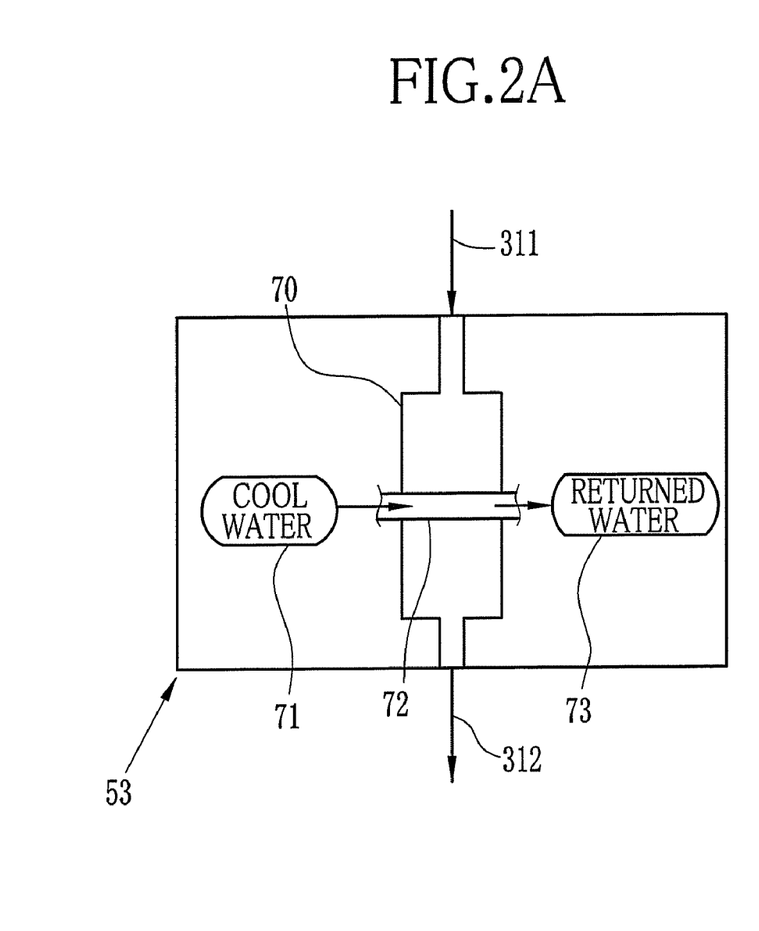
FIG. 2A is a schematic diagram showing an outline of a cooling process applied to a first processed air.

As shown in FIG. 2A, in the cooler 53, a gas passage 70 inside which the first processed air is passed through is provided. To the gas passage 70, a cool water passage 72 inside which water whose temperature is maintained at a predetermined value (hereinafter called as the cool water) 71 is passed through is attached. Note that although in the figure only one cool water passage 72 is shown, it is preferable that plural cool water passages 72 are provided for improving cooling efficiency. The cool water 71 is cooled by a refrigerating machine to approximately 7° C. Temperature of the first processed air 311 is reduced by work of the cool water passage 72, and evaporated low-melting point additive (described later) and the like are liquidized. The liquid is attached to surfaces of the gas passage 70 and the cool water passage 72. This process is called as the cooling process. According to the cooling process, the first processed air 311 is separated into the liquid of the additives and second processed air 312. The cool water 71 is returned to the refrigerating machine as water 73 to be returned after passing through the cool water passage 72, and reused as the cool water 71 after cooled by the refrigerating machine.

Figure 2B:
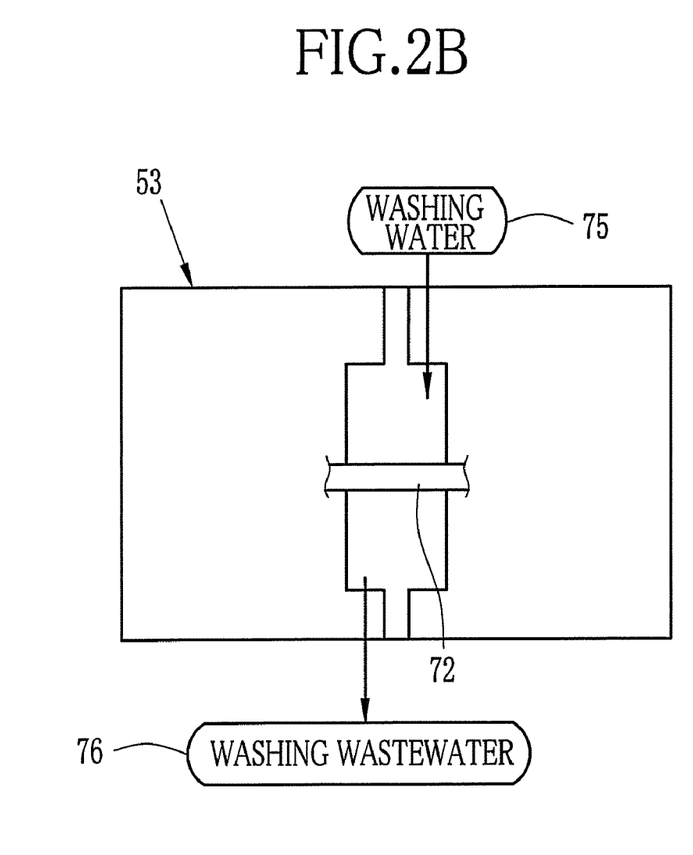
FIG. 2B is a schematic diagram showing an outline of a process for dissolving additives attached to a cooler with use of washing water.

As shown in FIG. 2B, washing water 75 is supplied into the gas passage 70 to dissolve and remove the low-melting point additive attached on the surface of the cool water passage 72. The washing water after dissolving the additives is sent to a washing wastewater processing line, as washing wastewater 76. In the washing wastewater processing line, the washing wastewater 76 is processed to remove impurities such as the additives contained in the washing wastewater 76. According to the washing wastewater process, the washing wastewater in which the impurities are removed can be reused as the washing water 75. Note that organic solvents, acids and alkalis can be used instead of the washing water 75, in consideration of the kind of the low-melting point additive. The temperature of the washing water 75 is preferably at least 20° C. higher, more preferably at least 25° C. higher than the melting point of the low-melting point additive attached to the surfaces.

In addition, as shown in FIG. 1, the pre-process activated carbon absorber 54 and the dehumidifier 55 are provided at downstream side from the cooler 53. The pre-process activated carbon absorber 54 removes the additives and the like contained in the second processed air 312. The dehumidifier 55 removes moisture in the second processed air 312. After that, the second processed air 312 is sent to the absorption device 57, 58 or 59 by the blower 56. The solvent contained in the second processed air 312 is absorbed by each of the absorption layers 57 to 59. This process is called as the absorption process. As the absorption layers 57 to 59, activated carbon is preferably used in view of durability. As the activated carbon, fibrous activated carbon, granular activated carbon and so on can be used. Especially, when the fibrous activated carbon is used, the absorption removal can be performed effectively in view of energetic consumption. In addition, as the absorbent, zeolite, silica gel or the like can be used instead of the activated carbon.

In the solvent removal line 48, a desorption gas feeder (not shown) is provided. The desorption gas feeder feeds desorption gas 65 to the absorption layers 57 to 59. The desorption gas 65 performs desorption of the solvent, the additives and the like absorbed (hereinafter called as the absorbed material) in the absorption devices 57 to 59. As the desorption gas 65, helium, nitrogen or the like is used. The absorbed material is sent to a condenser 66 with the desorption gas 65, where the absorbed material is subjected to adsorption recovery and becomes a recovered material 67. The recovered material 67 is sent to a recovered material processing device (not shown), to be separated into purified liquid and wastewater. The purified liquid is sent to a component adjusting device (not shown) where the components in the purified liquid are adjusted, to be reused as the solvent (or solution liquid) for preparing the dope. The reuse of the solvent can help to perform the solution casting method in low cost. In addition, the reuse is also preferable in view of environmental protection, because emission of the organic solvent in the atmosphere is minimized.

The second processed air 312 after the absorption process is controlled to a predetermined temperature by the temperature controller 60, to become temperature controlled air 313. The temperature controlled air 313 is sent to the heater 63 by the blower 62 through the reducing agent removal line 51. In the reducing agent removal line 51 and the heater 63, the temperature controlled air 313 is heated to a predetermined temperature, to become the before-drying air 300. The before-drying air 300 is sent to the drying zone 12 by a blower (not shown).

[Retardation Reducing Agent Removal Line]

As shown in FIG. 3, the reducing agent removal line 51 includes a heat exchanger 100, an air supply line 101 and a cleaning liquid supply line 102.

[Heat Exchanger]

Figure 4:
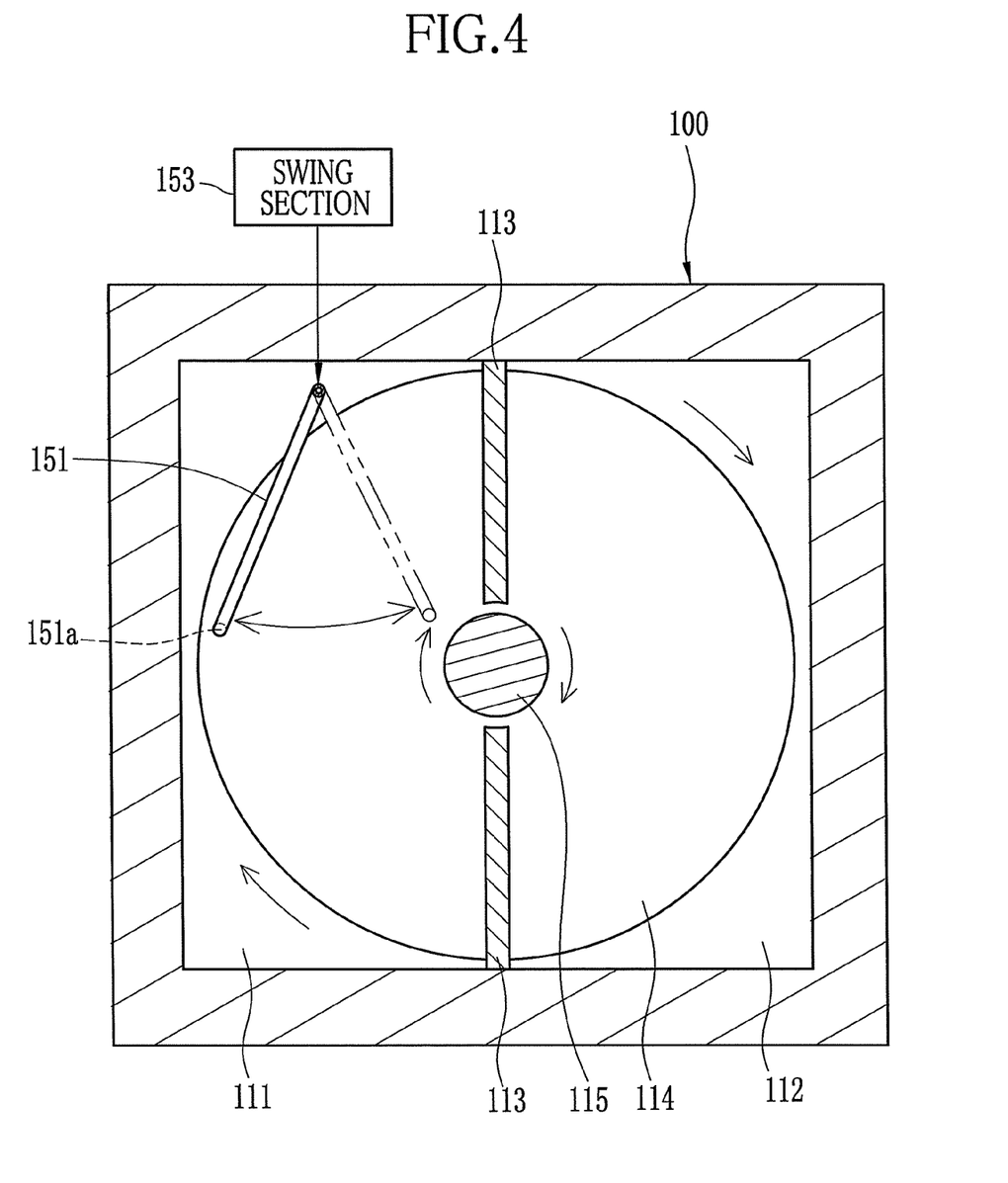
FIG. 4 is a cross-sectional view along the line IV-IV in FIG. 3.

Next, with reference to FIG. 3 and FIG. 4, the heat exchanger 100 will be described. The heat exchanger 100 is formed in a box shape with a material having thermal insulation property. The heat exchanger 100 has a first passage chamber 111 and a second passage chamber 112. A partition plate 113 having thermal insulation property is provided at a border between the first and second passage chambers 111 and 112. The partition plate 113 shields movement of gas between the first and second passage chambers 111 and 112. In addition, the heat exchanger 100 has a heat exchanging element 114 formed in an approximately disk shape. A part of the heat exchanging element 114 is in the first passage chamber 111, and the rest is in the second passage chamber 112. To the center of the heat exchanging element 114, a driving shaft 115 is connected. A motor 116 is connected to the driving shaft 115. The motor 116 rotates the heat exchanging element 114 at a predetermined speed (1 rpm to 10 rpm) around the driving shaft 115 (the rotational center is positioned approximately on the border between the first and second passage chambers 111 and 112.

[First Passage Chamber]

The first passage chamber 111 is connected to the drying zone 12 through the pipe 64, air supply line 101 and a pipe 120. The first passage chamber 111 and the blower 52 (see FIG. 1) is connected by a pipe 121. The blower 52 feeds the first processed air 311 generated in the first passage chamber 111 to the cooler 53 through the pipe 121. In addition, in the first passage chamber 111, a draining pipe 122 for draining washing waste liquid 320 generated in the first passage chamber 111 is provided. The draining pipe 122 is connected to the cleaning liquid supply line 102 (described later).

[Second Passage Chamber]

The second passage chamber 112 and the blower 62 (see FIG. 1) are connected through a pipe 123. The second passage chamber 112 and the drying zone 12 are connected through a pipe 124. For the pipe 124, the heater 63 is provided.

[Heat Exchanging Element]

The heat exchanging element 114 has a plurality of vents. The vents are formed and arranged to form a honeycomb-structure. The after-drying air 301 from the pipe 120, the temperature controlled air 313 and cleaning liquid (described later) are passed through the vents. When the after-drying air 301 passes through the vents, the heat exchanging element 114 absorbs heat from the after-drying air 301, and when the temperature controlled air 313 passes through the vents, the heat exchanging element 114 gives heat to the temperature controlled air 313. Note that details of the heat exchanging element are described in Japanese Patent Laid-Open Publication No. 2004-294052.

[Air Supply Line]

As shown in FIG. 3, the air supply line 101 has an additive solution tank 130, a heater 131, a mixing device 132 and a mixture ratio controller 133. At the downstream side from the additive solution tank 130, the heater 131 and the mixing device 132 are arranged in this order. The mixing device 132 is connected to the pipe 64 and the pipe 120. The additive solution tank 130 and the heater 131 are connected through a pipe to which a pump and a valve are provided. The heater 131 and the mixing device 132 are connected through a pipe to which a pump 135 and a valve are provided.

[Additive Solution Tank]

In the additive solution tank 130, additive solution (liquid formed of the low-melting point additive dissolved in the solvent) 400 is stored. To the additive solution tank 130, a temperature controller 130a is provided. The temperature controller 130a maintains temperature of the additive solution 400 stored in the additive solution tank 130, in a desired range (not less than 50° C. and not more than 70° C.). For simplifying the solvent recovery process, the solvent used for the additive solution 400 is preferably same to the solvent used in the film producing apparatus 10.

[Low-Melting Point Additive]

As the low-melting point additive contained in the additive solution 400, an compound whose melting point is lower than the boiling point of cleaning liquid 321 (described later), which can change the melting point MP1 of the retardation reducing agent in mixed air 402 (described later) according to a mixture ratio M of the mixed air 402, is used. It is preferable that the melting point of the compound is at least 10° C. lower than the boiling point of the cleaning liquid 321. For simplifying the solvent recovery process, the low-melting point additive is preferably the additive used in the film producing apparatus 10, more preferably the additive contained in the after-drying air 301.

As concrete examples of the low-melting point additive, there are diphenoxy phosphoryl oxybenzene (TPP), bis(2-Ethylhexyl)phthalate (DOP), cresyl diphenyl phosphate (CDP), biphenyl diphenyl phosphate (BDP) and soon. In addition, the compounds described above as the additives used for the dope 13 can be used.

[Heater and Pump]

The heater 131 is connected to the mixture ratio controller 133. Under the control of the mixture ratio controller 133, the heater 131 heats the additive solution 400 from the additive solution tank 130 to a desired temperature (not less than 50° C. and not more than 80° C.). According to the heating, the solvent and the low-melting point additive are evaporated from the additive solution 400, and additive containing air 401 is generated. The pump 135 is connected to the mixture ratio controller 133. Under the control of the mixture ratio controller 133, the pump 135 feeds the additive containing air 401 generated in the heater 131 to the mixing device 132. Accordingly, the mixture ratio controller 133 can feed the additive containing air 401 to the mixing device 132 while vapor pressure of the additive containing air 401 is controlled to a desired value, with use of the heater 131 and the pump 135.

[Mixing Device]

The after-drying air 301 from the drying zone 12 and the additive containing air 401 from the heater 131 stay in the mixing device 132. In the mixing device 132, there is a propeller 137 connected to a motor (not shown). The motor rotates the propeller 137 at a predetermined speed. According to the rotation of the propeller 137, the after-drying air 301 and the additive containing air 401 are stirred and mixed in the mixing device 132, and the mixed air 402 is generated. It is preferable that the rotation speed of the propeller 137, a blade shape of the propeller 137 and other conditions are determined to effectively perform the mixing of the after-drying air 301 and the additive containing air 401.

To the pipe 120 connecting between the mixing device 132 and the heat exchanger 100, a bulb (not shown) and a pump 138 are provided. The bulb and the pump 138 are connected to the mixture ratio controller 133. Under the control of the mixture ratio controller 133, the bulb and the pump 138 feed the mixed air 402 to the heat exchanger 100 at a predetermined flow rate.

[Density Sensor]

The mixing device 132 has a density sensor 132a. The density sensor 132a detects densities of the low-melting point additive and the retardation reducing agent in the mixing device 132. As the density sensor, gas chromatography, liquid chromatography or the like can be used.

[Mixture Ratio Controller]

The mixture ratio controller 133 detects the mixture ratio M (content of the low-melting point additive in the mixed air 402) through the density sensor 132a. According to the detecting result, the mixture ratio controller 133 controls the heater 131 and the pump 135 to maintain the mixture ratio M in a desired range. It is preferable that the mixture ratio M is no less than 30 wt. % and no more than 50 wt. %. When the mixture ratio M is less than 30 wt. %, the melting point of the retardation reducing agent is 100° C. or more so that the agent cannot be cleaned by hot water. When the mixture ratio M is more than 50 wt. %, the low-melting point additive is remained in the before-drying air 300 fed from the solvent removal line 48 into the drying zone 12, and the remaining low-melting point additive adversely affects a postdrying process (described later). Note that the mixture ratio M is a value calculated by a formula $y/(x+y)$, when x is the weight of the retardation reducing agent in the mixed air 402, and y is the weight of the low-melting point additive in the mixed air 402. Concretely, the mixture ratio M can be controlled by changing the vapor pressure of the additive containing air 401 with use of the heater 131 and the pump 135 according to the detected value obtained by the density sensor 132a.

[Cleaning Liquid Supply Line]

The cleaning liquid supply line 102 has a cleaning liquid tank 150, a pipe 151 and a settling device 152. The cleaning liquid tank 150 stocks the cleaning liquid 321, and has a temperature controller 150a. The temperature controller 150a maintains the temperature of the cleaning liquid 321 in the cleaning liquid tank 150, in a predetermined range (higher than the melting point and lower than the boiling point of the cleaning liquid). Note that it is preferable that the temperature of the cleaning liquid 321 is maintained in a range at least 10° C. higher than the melting point of the solvent in the mixed air 402 and at least 30° C. lower than the melting point MP1 in the mixed air 402, for separately recovering the retardation reducing agent, other additives and the solvent in the first passage chamber 111. It is also preferable that the temperature of the cleaning liquid 321 is higher than the melting point of the low-melting point additive.

[Cleaning Liquid]

As the cleaning liquid 321, any liquid which can dissolve the precipitations precipitated by the cooling of the mixed air 402 in the first passage chamber 111 can be used. Concretely, it is preferable to use water.

[Pipe]

The pipe 151 connects between the cleaning liquid tank 150 and the first passage chamber 111. To the pipe 151, a pump 151b and a valve are provided. At the end (the first passage chamber 111 side) of the pipe 151, an outlet 151a is provided. The cleaning liquid 321 in the cleaning liquid tank 150 flows out from the outlet 151a at a predetermined flow rate, by operation of the pump 151b and the valve. A swing section 153 (see FIG. 4) is provided to the pipe 151 and connected to a controller (not shown). The swing section 153 can swing the outlet 151a of the pipe 151 under control of the controller, so that the position of the outlet 151a can be changed in the first passage chamber 111. It is preferable that the pipe 151 is a jacketed pipe which can maintain the temperature of the cleaning liquid 321 flowing in the pipe 151, in a predetermined range (higher than the melting point and lower than the boiling point of the cleaning liquid).

[Settling Device]

The settling device 152 is connected to the draining pipe 122 provided in the first passage chamber 111. The settling device 152 contains the washing waste liquid 320 from the first passage chamber 111. The settling device 152 connected to a waste tank 155. To the washing waste liquid 320 in the settling device 152, a gravity separation process is applied. According to the gravity separation process, settlings 323 are generated in the washing waste liquid 320. The settlings 323 are discharged into the waste tank 155 from an outlet 152a of the settling device 152. In the settlings 323, the retardation reducing agent is contained. To improving purity of the retardation reducing agent in the settlings 323, plural times of the gravity separation process and other condensing processes can be applied to the settlings 323. The retardation reducing agent obtained by the above processes can be reused for preparing the dope.

[Retardation Reducing Agent Removing Process]

Next, a reducing agent removing process, which is for removing the retardation reducing agent from the after-drying air 301, is described. As shown in FIG. 3, the after-drying air 301 generated by the drying process is sent to the mixing device 132 by the blower 32. And the additive solution 400 whose temperature is controlled in the range of 50° C. to the 70° C. is sent to the mixing device 132 from the additive solution tank 130 through the heater 131 and the pump 135.

The mixture ratio controller 133 controls the heater 131 and the pump 135 to control the vapor pressure of the additive containing air 401. Accordingly, the mixed air 402 in which the melting point MP1 of the retardation reducing agent is in the desired range is generated in the mixing device 132. The mixed air 402 flows into the first passage chamber 111 through the pump 138 at the predetermined flow rate. The mixed air 402 passes through the vents on the heat exchange element 114 in the first passage chamber 111. At this moment, the mixed air 402 contacts the heat exchanging element 114, and the heat exchanging element 114 takes the heat of the mixed air 402. Accordingly, the mixed air 402 is cooled and mixture material including the retardation reducing agent is attached on the heat exchanging element 114. Through this process, the mixed air 402 becomes the first processed air 311. The first processed air 311 is fed to the cooler 53 from the first passage chamber 111 by the blower 52 through the pipe 121.

The heat taken from the mixed air 402 is transmitted to the temperature controlled air 313 which passes through the vents on the heat exchanging element 114 which alternately rotates between the first passage chamber 111 and the second passage chamber 112. That is, heat exchange is performed between the mixed air 402 and the temperature controlled air 313 through the heat exchanging element 114. After that, the temperature controlled air 313 is further heated by the heater 63 and fed into the drying zone 12 as the before-drying air 300.

The cleaning liquid 321 flows onto the heat exchanging element 114 from the outlet 151a. At this time, the swing section 153 (see FIG. 4) swings the outlet 151a to feed the cleaning liquid 321 in a range from the outermost periphery to the innermost periphery of the heat exchanging element 114. Accordingly, the mixture material attached on the heat exchanging element 114 contacts the cleaning liquid 321 in the mixed air. Since the temperature of the cleaning liquid 321 is higher than the melting point MP1 of the retardation reducing agent in the heat exchanger 100, the mixture material is dissolved in the cleaning liquid 321. The cleaning liquid 321 contains the dissolved mixture material is sent as the washing waste liquid 320 into the settling device 152 through the draining pipe 122.

In the cooler 53, the first processed air 311 contacts the cool water passage 72 (the cooling process). Through this process, the first processed air 311 is separated into the second processed air 312 and the liquid of the low-melting point additive and other additives.

In the solvent removal line 48 of the present invention including the retardation reducing agent removal line 51 and the cooler 53, the mixed air 402 is generated from the after-drying air 301, and the mixed air 402 is cooled. By the cooling of the mixed air 402, the mixture material including the retardation agent whose melting point is higher than the boiling point of water and soluble in the hot water (below 100° C.) is generated. Accordingly, the solvent removal line 48 can separately remove the retardation reducing agent, the low-melting point additive, other additives and the solvent from the after-drying air 301, without interruption the processes to remove intermediate materials generated in each process. Therefore, the solvent removing can be performed effectively and continuously for a long time.

In the above embodiment, the mixture material precipitated by the contact between the mixed air 402 and the heat exchanging element 114, and the cleaning liquid 321 are in contact in the mixed air 402. However, it can be also that at first the after-drying air 301 and the heat exchanging element 114 are in contact to precipitate the mixture material including the retardation reducing agent, then the mixed air 402 is generated by flowing the additive containing air 401 into the first passage chamber 111, and finally the mixture material and the cleaning liquid 321 are in contact in the mixed air 402.

In the removing method of present invention, also other high-melting point compounds satisfying at least one of conditions listed below can be removed as same as the retardation reducing agent:

(1) a material evaporating with the solvent in the band zone 11 or the drying zone 12;

(2) a material having high melting point (at least 90° C.) when precipitated by cooing of the after-drying air 301;

(3) a material whose melting point is dropped by being mixed with the low-melting point compound.

[Experiment 1]

Experiment 1 of the present invention is described now. Note that the experiment does not limit the present invention. Experiment 1 will be described in detail. However, Experiments 2-4 and Comparative experiments 1-3 will be described mainly for their differences from Experiment 1. Their results will be indicated in Table 1.

Preparation of the Dope for Use in the Polymer Solution is indicated below.

[Composition]

100 Parts by weight of cellulose triacetate (substitution degree: 2.94, viscosity average degree of polymerization (DP): 305, water content: 0.5 wt. %, viscosity of 6 wt. % dichloromethane solution: 350 mPa·s, average particle diameter and standard deviation of the particle diameter: 1.5 mm and 0.3 mm);

390 parts by weight of dichloromethane, as a first solvent;

60 parts by weight of methanol, as a second solvent;

12 parts by weight of retardation reducing agent (n-phenyl-p-toluenesulfonamide) (compound A);

0.8 part by weight of wavelength dispersion controlling agent (2-hydroxy-4-octoxy-benzophenone);

0.006 part by weight of mixture of citrate esters (mixture of citric acid, citrate monoethyl ester, citrate diethyl ester, and citrate triethyl ester);

0.05 part by weight of fine particles of silicon dioxide with a particle diameter of 15 nm, and Mohs hardness number of approx. 7.

[Cellulose Triacetate]

In the cellulose triacetate (TAC), an amount of the residual acetic acid was 0.1 wt. % or less. The TAC contained 58 ppm of Ca, 42 ppm of Mg, 0.5 ppm of Fe, 40 ppm of the free acid content of acetic acid, and 15 ppm of sulfur ion. In the TAC, a degree of acetyl substitution of the 6-position was 0.91. A ratio of the acetyl group of the substitution of the 6-position relative to all of the acyl groups was 32.5%. In the TAC, an extracted amount of acetone was 8 wt. %. A ratio of the weight average molecular weight to the number average molecular weight was 2.5. In the TAC, the yellow index was 1.7. The haze was 0.08. A degree of transparency was 93.5%. The glass transition temperature Tg measured by the DSC (Differential Scanning Calorimetry) was 160° C. An amount of heat of crystallization was 6.4 J/g. Raw material of cellulose for the TAC was fibrous material collected from cotton. The TAC here in will be referred to as cotton-derived TAC.

(1) Preparation of Dope

The dissolving tank of stainless steel was 4,000 liters large, and mixed delivered solvents by stirring to obtain mixed solvent. All of the solvent for use had the water content of 0.5 wt. % or less. Then the hopper added TAC flake or powder gradually to the mixed solvent. The inside of the dissolving tank was stirred for a first dispersing step by use of the dissolver stirrer and the anchor stirrer for 30 minutes at a prescribed shear rate, the dissolver stirrer stirring at 5 m/sec as a peripheral speed for the shear rate, the anchor stirrer stirring at 1 m/sec as a peripheral speed for the shear rate. The temperature was 25° C. at the start of the dispersion, and 48° C. at the final step of the dispersion. The mixed solvent containing the above plural solvents was stored in the dissolving tank, and stirred and dispersed, while TAC flake was added to the mixed solvent by the hopper, to prepare the composition with a weight of 2,000 kg. After the dispersion, the stirring at the high speed was stopped. The anchor stirrer stirred further for 100 minutes at the peripheral speed of 0.5 m/sec, to obtain the swollen liquid by swelling the TAC flake. Before the end of the swelling, the inside of the tank was pressurized with gaseous nitrogen at 0.12 MPa. The oxygen density inside the dissolving tank was 2 vol. % or less, which is a safe condition in view of explosion-proof. A water content in the dope was 0.3 wt. %.

(2) Dissolving and Filtration

The swollen liquid was delivered to a jacketed pipe from the dissolving tank. The jacketed pipe heated the swollen liquid up to 50° C., and further heated the swollen liquid to 90° C. during application of pressure of 2 MPa, for completed is solution. Time in the course of heating was 15 minutes.

Then the swollen liquid was cooled by the temperature adjuster down to 36° C., and caused to pass the filtration device having a filter with a nominal pore diameter of 8 microns, to obtain dope (unconcentrated dope). Pressure on the primary side of the filtration was 1.5 MPa. Pressure on the secondary side of the filtration was 1.2 MPa. Elements of metal subjected to high temperature were formed from alloy with a trade name of Hastelloy, the elements including the filter, housing and conduits. The metal had high resistance to corrosion. Those elements were provided with a jacket for flow of heat exchange medium for controlling heat.

(3) Condensation, Defoaming and Filtration

The dope before the concentration was flushed in the flushing machine conditioned at 80° C. with an atmospheric pressure. Solvent was liquefied, collected and separated by the solvent recovery device. The amount of the solid content of the flushed dope was 21.8 wt. %. The collected solvent was adjusted for preparation by the solvent regenerator for reuse. After the regeneration in the solvent regenerator, the solvent was sent to the solvent tank. Distillation and dehydration were effected in the solvent recovery device and the solvent regenerator. A flushing tank in the flushing machine included an anchor stirrer (not shown) at the center. The anchor stirrer stirred the dope for eliminating bubbles by rotations at the peripheral speed of 0.5 m/sec. Temperature of the dope in the flushing tank was 25° C. Average staying time in the tank of the dope was 50 minutes. Shear viscosity of the dope at 25° C. was 450 Pa·s at the shear rate of 10 $(sec^{-1})$.

Then bubbles were eliminated from the dope by ultrasonic waves of low energy for defoaming. The pump was used for the dope to flow to the filtration device in a pressurized state of 1.5 MPa. In the filtration device, the dope was passed through a sintered fiber metal filter with a nominal minimum pore diameter of 10 microns, and then through a sintered fiber filter with a nominal minimum pore diameter of 10 microns. For those filters, the primary pressure was respectively 1.5 and 1.2 MPa, the secondary pressure being respectively 1.0 and 0.8 MPa. The filtrated dope was conditioned at the temperature of 36° C., and stored in the storing tank of stainless steel and 2,000 liters large. The dope of this state is referred to herein as raw material dope. The tank contained the anchor stirrer at its center, and stirred the dope incessantly at a peripheral speed of 0.3 m/sec. As a result, no problem of corrosion or the like occurred in portions of device elements contacting the dope in preparing the dope from that before the concentration.

(4) Ejection, Casting and Decompression

The film producing apparatus 10 in FIG. 1 was used to form the polymer film 25. The dope 13 in the storing tank was delivered by the gear pump of high precision type to the filtration device. The gear pump was according to feedback control of an inverter motor in such a manner as to set the pressure of a primary side at 0.8 MPa. The gear pump had a volume efficiency of 99.2%, and a ratio of fluctuation of 0.5% or less in the ejected amount. A pressure of ejection of the gear pump was 1.5 MPa. The dope 13 passed through the filtration device was sent to the casting die 23.

The dope 13 was cast by controlling its flow rate at the casting die 23 so as to obtain the polymer film 25 with a web width of 1.8 meters, and a thickness in a dried state of 80 microns. A casting dope width of the dope 13 at the casting die 23 was 1,700 mm. A jacket (not shown) was provided in combination with the casting die 23, for maintaining the heat exchange medium at the temperature 36° C. at an upstream end of the jacket, for setting the dope 13 at 36° C.

Any one of the casting die 23 and the pipes were kept warm at 36° C. in the course of casting to form the film. The casting die 23 was a coat hanger type. The casting die 23 had thickness adjusting die bolts or heat bolts arranged at a pitch of 20 mm. The die bolts were adapted to automatic adjustment of the thickness. The die bolts were constructed to set up a specific profile according to a flow amount of the high-precision gear pump by a stored program, and also were capable of feedback control according to an adjusting program based on the specific profile of an infrared thickness meter (not shown) installed in the film producing apparatus 10. A thickness difference between two points of any combination which are on the polymer film and distant to one another at 50 mm was no more than 1 micron except for edge portions being 20 mm wide. The greatest difference between minimum values of the thickness in the width direction was no more than 3 microns per meter. Precision in the thickness was so determined that an average error in the total film thickness was equal to or less than 1.5%.

The decompressing chamber was connected with the casting die 23 for negative pressure on the primary side. The decompressing chamber was structured to create a difference in the pressure in a range of 1 Pa to 5,000 Pa between two sides defined by the casting bead, and was adjustable according to the casting speed. The difference in pressure was determined so as to set a length of the casting bead at 20 mm to 50 mm. Also, a mechanism of the decompressing chamber was structured to set the chamber temperature higher than a condensation temperature of ambient gas present around the position of casting. A labyrinth packing (not shown) was disposed at each of the two sides defined by the casting bead. Also, openings were formed in lateral ends of the die slot of the casting die 23. The decompressing chamber had an edge suction device (not shown), secured to the casting die 23, for eliminating irregularity in side edges of the casting bead.

(5) Casting Die

A material of the casting die 23 was stainless steel of a type of precipitation hardening, had a coefficient of thermal expansion of $2\times10^{-5}$ (° C.$^{-1}$) or less. This had a corrosion resistance equal to that of SUS 316 steel according to forced corrosion test in electrolytic aqueous solution. Also, the material of the casting die 23 had the corrosion resistance sufficient for prevention of pitting on the gas-liquid interface even after dipping in a liquid mixture of dichloromethane, methanol and water for three months. Surfaces of the casting die 23 to contact the liquid were formed with precision to have a surface roughness of 1 micron or less, and a degree of straightness of 1 micron per meter or less in any direction. A clearance of the die slot was determined as 1.5 mm. Corner portions at the end of the die lip to contact the liquid were shaped so as to set a radius of curvature R at 50 microns or less. The shear rate of the dope 13 inside the casting die 23 was in a range of 1(1/sec) to 5,000 (1/sec). The end of the lip of the casting die 23 was coated with a WC coating by a thermal spray process, to form a hardened layer.

(6) Support of Metal

The casting band 22 was an endless band of stainless steel, and was 2.1 meters wide and 70 meters long. A thickness of the casting band 22 was 1.5 mm. A surface roughness of the casting band 22 was 0.05 micron or less owing to polishing the band surface. The material of the casting support band 22 was SUS 316, and had sufficient strength and resistance to corrosion. Irregularity of the thickness of the casting band 22 was 0.5% or less. The casting band 22 was driven to turn by the rollers 20 and 21. Tension exerted in the casting band 22 in rotation of the rollers 20 and 21 for driving was controlled and regulated at a level of $1.5\times10^5$ N per sq. meter. A difference in the speed between the casting band 22 and the rollers 20 and 21 was regulated at 0.01 m/min or less. A fluctuation in the speed of the casting band 22 was 0.5% or less. A zigzag movement of the casting band 22 in the bandwidth direction was limited to 1.5 mm or less during one turn of the casting band 22 by monitoring band edges. An under-die portion of the casting band 22 directly under the casting die 23 was kept from moving beyond a range of 200 microns in a vertical direction from the end of the die lip. The casting band 22 was contained in the band zone 11 which had a mechanism (not shown) for suppressing fluctuation of gas pressure. The dope 13 was cast by the casting die 23 onto the casting band 22.

A flow conduit for a heat exchange medium was formed through the rollers 20 and 21, for control of the temperature of the casting band 22 through the heat exchange medium flowing inside the rollers 20 and 21. Heat exchange medium of 5° C. was introduced to the roller 21 on the side of the casting die 23. Heat exchange medium of 40° C. was introduced to the roller 20 on the opposite side for drying the casting film. Shortly before the casting, a surface temperature at the center of the casting band 22 was 15° C. A difference between the end temperatures at the ends of the casting band 22 was 6° C. or less. It was preferable to minimize the surface defects on the casting band 22. Specifically, an amount of a pinhole in a size of 30 microns or more was zero. An amount of a pinhole in a size equal to or more than 10 microns and less than 30 microns was one or less per sq. meter. An amount of a pinhole in a size less than 10 microns was two or less per sq. meter.

(7) Casting and Drying

Inside temperature of the band zone 11 was kept at 35° C. by use of a temperature controlling device. The casting film formed from the dope cast on the casting band 22 was dried by dry gas initially flowing in parallel. An overall heat transfer coefficient from the dry gas to the casting film was 24 kcal/(m$^2$·hr·° C.). A vent positioned higher than the casting band 22 at its upstream portion blew dry gas at 135° C. The vent 71, positioned higher than the casting support band 34 at its downstream portion, blew dry gas at 140° C. A vent positioned under the casting band 22 blew dry gas at 65° C. The saturation temperature of each of the flows of the dry gas was approximately −8° C. Oxygen density at the casting band 22 in the dry atmosphere was kept at 5 vol. %. For this purpose, gaseous nitrogen was substituted for air. A condenser was installed for condensing and collecting solvent in the band zone 11, and had an exit or downstream end conditioned at −10° C.

A gas blocking panel operated for five seconds after the casting, and regulated the change in the static pressure near to the casting die 23 in a range of 1 Pa or less, by preventing the dry gas from directly striking the dope or the casting film. When an amount of the solvent in the casting film became down to 50 wt. % according to the dry base, the peeling roller 24 was driven to support to peel the casting film from the casting band 22, as the film 25. Note that the amount of the contained solvent according to the dry base is calculated as [(x−y)/y]×100, where x is a weight of the film at the time of sampling, and y is a weight of the same after drying. Tension of peeling was $1\times10^2$ N/m$^2$. For the purpose of suppressing failure in the peeling, a peeling speed or peeling roller draw was adjusted in a range of 100.1% to 110% of a speed of the casting band 22. A surface temperature of the peeled film 25 was 15° C. An average of a drying speed on the casting band 22 was 60 wt. % of the solvent per minute according to the dry base of the solvent. Evaporated solvent was condensed by the condenser 66 conditioned at −10° C., and collected by a solvent recovery device. Water in the collected solvent was conditioned with water content of 0.5% or less. The dry gas after removal of the solvent was heated again, and reused as dry gas for blowing. The film 25 was transported by the rollers in the transition assembly and to the tenter 26. Dry gas at 40° C. was blown by a blowing machine to the film 25. While the rollers transport the film 25 in the transition assembly, tension of approximately 30 N was applied to the film 25.

(8) Tentering, Drying and Edge Slitting

The film 25 upon entry in the tenter 26 was fed in the drying zones in the tenter 26 while retained by tenter clips on the web edges, and dried by dry gas. The tenter clips were cooled or thermally controlled by heat exchange medium of 20° C. by flow through the conduits in those. A chain was used to drive the tenter clips. Fluctuation in the speed of the sprocket of the chain was 0.5% or less. There were three zones defined in the tenter 26. Temperature of dry gas for those zones was conditioned at respectively 90, 110 and 120° C. in the order in the stretching direction. Composition of the dry gas had saturation gas density of −10° C. An average drying speed in the tenter 26 was 120 wt. %/min with reference to the dry base. The drying zones were conditioned so that the amount of the residual amount of the film 25 was 7 wt. % at the downstream end of the tenter 26. The film 25 was also stretched in the web width direction while transported in the tenter 26. Tension in the wed width direction was so set that a width of the film 25 after the stretch was 103% as much as that of the film 25 before the stretch. A stretching ratio from the peeling roller 24 to the tenter 26, namely, tenter driving draw, was 102%.

In relation to the stretching ratio inside the tenter 26, a difference in the substantial stretching ratio between any two points at portions 10 mm or more distant from the upstream tentering end was 10% or less. A difference in the stretching ratio between any two points 20 mm distant from one another was 5% or less. A ratio of a length between a clip start position and a clip release position to a length between the entrance and the exit of the tenter 26 was 90%. The solvent gasified in the tenter 26 was condensed at the temperature of −10° C. into a liquid phase and collected. A condenser (not shown) was used, whose exit was conditioned at −8° C. Furthermore, the solvent was regenerated for the reuse by adjusting the amount of its water content at 0.5 wt. % or less. Finally, the film 25 was fed forwards from the tenter 26.

Web edges of the film 25 were slitted by the edge slitting device within 30 seconds after the exit from the tenter 26. An NT cutter in the edge slitting device slitted the web edges being 50 mm wide. A cutter blower (not shown) blew the obtained web edge portions into a crusher, which ground the web edge portions into chips or particles with an average area of 80 mm$^2$. The chips were utilized as raw material for regeneration in producing the dope together with the TAC flake. In the dry atmosphere of the tenter 26, density of the oxygen was kept at 5 vol. %. For this purpose, gaseous nitrogen was used for substitution in air. There was a pre-drying chamber (not shown), which heated the film 25 in a preliminary manner with dry gas of 100° C. before drying in the drying zone 12.

(9) Postdrying, and Removal of Electricity

In the drying zone 12, the film 25 was dried at a high temperature. Four zones were defined inside the drying zone 12. Blowers (not shown) or fans caused dry gas to blow the film 25 at 120° C., 130° C., 130° C. and 130° C. associated with respectively the zones in a downstream sequence. Tension applied to the film 25 by the transport with the rollers 27 was 100 N/m. The film 25 was dried for approximately 10 minutes until the amount of the residual solvent came down to 0.3 wt. %. A wrapping angle (arc of contact) of the roller 27 in winding the film 25 was 90° or 180°. The rollers 27 were formed from aluminum or carbon steel, and coated with hard chrome plating. A plurality of the rollers 27 included some prepared in a smoothly curved form, and others prepared in a matted form obtained by blasting. The positional fluctuation (or eccentricity) of the film 25 on the rotating roller 27 was within 50 μm. Flexure of the roller 27 at the tension of 100 N/m was determined 0.5 mm or less.

The dried film 25 was transported into a first moisture control chamber (not shown). The dry gas at 110° C. was fed into a transfer section between the drying zone 12 and the first moisture control chamber. The air with the temperature of 50° C. and the dew point of 20° C. was fed in the first moisture control chamber. Further, in order to reduce the generation of the curling, the film 25 was transported into a second moisture control chamber (not shown). The air with the temperature 90° C. and the humidity of 70% was directly fed onto the film 25 in the second moisture control chamber.

(10) Knurling and Winding

The film 25 after the moisture thereof being controlled was cooled to equal to or less than 30° C., and both web edge portions thereof were slit off or trimmed by an edge slitting device (not shown). A neutralization device (neutralization bar) was provided so that the charged voltage in the film 25 in transporting was kept in a range of −3 kV to +3 kV. Further, then knurling on the both sides of the film 25 was made with use of a knurling roller. The knurling was given such that the film 25 was embossed from one of the both sides. An average width of the area for knurling was 10 mm, and the pressure of the knurling roller was determined so that an average height of convex might be 12 μm higher than the average thickness of the film 25.

Thereafter, the film 25 was transported into a winding chamber in which the temperature and the humidity were kept to 28° C. and 70%. Further, an ionizer (not shown) was provided in the winding chamber so that the charged voltage in the film 25 was kept in a range of −1.5 kV to +1.5 kV. The product film had 1475 mm width and 80 μm thickness. The diameter of a winding roller in the winding chamber was 169 mm.

The temperature controller 130a maintained the temperature of the additive solution 400 in the additive solution tank 130, in the range of 50° C. to 80° C.

Composition of the additive solution 400 was indicated below:
 390 parts by weight of dichloromethane, as a first solvent;
 60 parts by weight of methanol, as a second solvent; and
 12 parts by weight of diphenoxy phosphoryl oxybenzene (compound B).

The mixture ratio controller 133 controlled the heater 131, the pump 135 and the density sensor 132a, to generate the mixed air 402 whose mixture ratio M was 50 wt. % in the mixing device 132. At this time, the melting point MP1 of the retardation reducing agent in the mixed air 402 was 80° C. Then the mixed air 402 was sent to the first passage chamber 111.

The mixed air 402 contacted the heat exchanging element 114 which rotated at the rotation speed of 5 rpm and whose temperature was kept in the range of 60° C. to 120° C. According to the contact, the mixed air 402 was separated into the first processed air 311 and the mixture material attached on the surface of the heat exchanging element 114. The first processed air 311 was sent to the cooler 53 by the blower 52 through the pipe 121.

To remove the mixture material, the cleaning liquid 321 whose temperature was maintained at the desired value (at least 60° C. and less than 95° C.) was sent onto the heat exchanging element 114 from the outlet 111a. The cleaning liquid 321 was water. The cleaning liquid 321 dissolved the mixture material, and the cleaning liquid 321 became the washing waste liquid 320. The washing waste liquid 320 was sent to the settling device 152 through the pipe 122. In the settling device 152, the gravity separation process was applied to the washing waste liquid 320, to separate the washing waste liquid 320 into the cleaning liquid 321 and the settlings 323.

In the cooler 53, the cool water 71 whose temperature was kept at approximately 7° C. flew in the cool water passage 72. According to the contact between the cool water passage 72 and the first processed air 311, the low-melting point additive and other additives were liquidized and attached to the surface of the cool water passage 72. Through this process, the low-melting point additive and other additives were removed from the first processed air 311, and the first processed air 311 became the second processed air 312. The second processed air 312 was sent to the pre-process activated carbon absorber 54. Further, in the cooler 53, the cleaning liquid 75 of approximately 70° C. was sent toward the cool water passage 72 on which the low-melting point additive and so on were attached. The cleaning liquid 75 removed (became to include) the low-melting point additive and so on, and became the washing waste liquid 76. The washing waste liquid 76 was sent to the washing waste liquid removing line. In the washing waste liquid removing line, the washing waste liquid process was applied to the washing waste liquid 76, to separate the washing waste liquid 76 into the cleaning liquid and the impurities such as the additives.

The second processed air 312 was sent to the pre-process activated carbon absorber 54, the dehumidifier 55, and the absorption layers 57 to 59. In each, the additives, moisture and the solvent still remained in the second processed air 312 were removed. Then the temperature of the second processed air 312 was controlled to the predetermined value by the temperature controller 60, and became the temperature controlled air 313. The temperature controlled air 313 was fed into the second passage chamber 112 by the blower 62. In the second passage chamber 112, the temperature controlled air 313 passed through the vents on the heat exchanging element 114, and flew toward the pipe 124. At this time, the heat from the mixed air 402 was transmitted to the temperature controlled air 313 through the heat exchanging element 114. After that, the temperature controlled air 313 was heated by the heater 63 and fed into the drying zone 12 as the before-drying air 300.

When gravimetric analysis with use of the gas chromatography was applied to the settlings 323 obtained by the gravity separation process and the impurities obtained by the washing waste liquid process, it was confirmed that the settlings contained n-phenyl-p-toluenesulfonamide, and the impurities contained diphenoxy phosphoryl oxybenzene.

[Experiment 2]

The solvent removal line 48 was operated in the same conditions and processes as Experiment 1, except that the mixture ratio M of the mixed air 402 generated in the mixing device 132 was 30 wt. %. In this experiment, the melting point MP1 of the retardation reducing agent in the mixed air 402 was 90° C. When gravimetric analysis with use of the gas chromatography was applied to the settlings 323 obtained by the gravity separation process and the impurities obtained by the washing waste liquid process, it was confirmed that the settlings contained n-phenyl-p-toluenesulfonamide, and the impurities contained diphenoxy phosphoryl oxybenzene.

[Comparative Experiment 1]

The solvent removal line 48 was operated in the same conditions and processes as Experiment 1, except that the mixture ratio M of the mixed air 402 generated in the mixing device 132 was 10 wt. %. In this experiment, the melting point MP1 of the retardation reducing agent in the mixed air 402 was 100° C. When gravimetric analysis with use of the gas chromatography was applied to the settlings 323 obtained by the gravity separation process and the impurities obtained by the washing waste liquid process, it was confirmed that the settlings contained n-phenyl-p-toluenesulfonamide, and the impurities contained diphenoxy phosphoryl oxybenzene.

[Comparative Experiment 2]

The solvent removal line 48 was operated in the same conditions and processes as Experiment 1, except that the mixture ratio M of the mixed air 402 generated in the mixing device 132 was 0 wt. %. In this experiment, the melting point MP1 of the retardation reducing agent in the mixed air 402 was 102° C. When gravimetric analysis with use of the gas chromatography was applied to the settlings 323 obtained by the gravity separation process and the impurities obtained by the washing waste liquid process, it was confirmed that the settlings contained n-phenyl-p-toluenesulfonamide, and the impurities contained diphenoxy phosphoryl oxybenzene.

[Comparative Experiment 3]

The solvent removal line 48 was operated in the same conditions and processes as Experiment 2, except that 2-(2H-benzotriazol-2-yl)-4,6-di-tert-pentylphenol (compound E) was used as the low-melting point additive. In this experiment, the melting point MP1 of the retardation reducing agent in the mixed air 402 was 120° C. When gravimetric analysis with use of the gas chromatography was applied to the settlings 323 obtained by the gravity separation process and the impurities obtained by the washing waste liquid process, it was confirmed that the settlings contained n-phenyl-p-toluenesulfonamide, and the impurities contained 2-(2H-benzotriazol-2-yl)-4,6-di-tert-pentylphenol.

[Experiment 3]

The solvent removal line 48 was operated in the same conditions and processes as Experiment 2, except that bis(2-Ethylhexyl)phthalate (compound C) was used as the low-melting point additive. In this experiment, the melting point MP1 of the retardation reducing agent in the mixed air 402 was 60° C. When gravimetric analysis with use of the gas chromatography was applied to the settlings 323 obtained by the gravity separation process and the impurities obtained by the washing waste liquid process, it was confirmed that the settlings contained n-phenyl-p-toluenesulfonamide, and the impurities contained bis(2-Ethylhexyl)phthalate.

[Experiment 4]

The solvent removal line 48 was operated in the same conditions and processes as Experiment 2, except that cresyl diphenyl phosphate (compound D) was used as the low-melting point additive. In this experiment, the melting point MP1 of the retardation reducing agent in the mixed air 402 was 65° C. When gravimetric analysis with use of the gas chromatography was applied to the settlings 323 obtained by the gravity separation process and the impurities obtained by the washing waste liquid process, it was confirmed that the settlings contained n-phenyl-p-toluenesulfonamide, and the impurities contained cresyl diphenyl phosphate.

[Experiment 5]

The solvent removal line 48 was operated in the same conditions and processes as Experiment 2, except that biphenyl diphenyl phosphate (compound F) was used as the low-melting point additive. In this experiment, the melting point MP1 of the retardation reducing agent in the mixed air 402 was 70° C. When gravimetric analysis with use of the gas chromatography was applied to the settlings 323 obtained by the gravity separation process and the impurities obtained by the washing waste liquid process, it was confirmed that the settlings contained n-phenyl-p-toluenesulfonamide, and the impurities contained biphenyl diphenyl phosphate.

[Evaluation]

In each of Experiments 1 to 5 and Comparative experiments 1 to 3, the solvent removal line 48 was operated with changing the temperature of the cleaning liquid 321 to check whether the mixture material attached on the heat exchanging element 114 was removed or not. The result was confirmed by visual observation of the heat exchanging element 114. The lowest temperature of the cleaning liquid 321 enable to remove the mixture material on the heat exchanging element 114 was determined as cleaning available temperature. In Table 1, the evaluations of Experiments 1 to 5 and Comparative experiments 1 to 3 were shown. When the cleaning available temperature was no less than 100° C., the evaluation was shown as P (Poor). When the cleaning available temperature was no less than 85° C. but less than 100° C., the evaluation was shown as A (Acceptable). When the cleaning 10 available temperature was less than 85° C., the evaluation was shown as G (Good).

TABLE 1

| | RRA | | LMA | | | M | |
|---|---|---|---|---|---|---|---|
| | Kind | MP (° C.) | Kind | MP (° C.) | (wt. %) | MP1 (° C.) | EV |
| Exam. 1 | Compound A | 102 | Compound B | 48 | 50 | 80 | G |
| Exam. 2 | Compound A | 102 | Compound B | 48 | 30 | 90 | A |
| Comp. 1 | Compound A | 102 | Compound B | 48 | 10 | 100 | P |
| Comp. 2 | Compound A | 102 | — | — | 0 | 102 | P |
| Comp. 3 | Compound A | 102 | Compound E | 154 | 30 | 120 | P |
| Exam. 3 | Compound A | 102 | Compound C | −46 | 30 | 60 | G |
| Exam. 4 | Compound A | 102 | Compound D | −30 | 30 | 65 | G |
| Exam. 5 | Compound A | 102 | Compound F | −13 | 30 | 70 | G |

RRA: Retardation reducing agent
LMA: Low-melting point additive
MP: Melting point
EV: Evaluation According to the present invention, since the mixed air is generated, the retardation reducing agent which is the high-melting point additive can be precipitated and molten by lower temperature than the natural melting point of the retardation reducing agent. Accordingly, even when the retardation reducing agent is added into the dope, the solvent recovering process can be continuously performed for a long time, as same as the conventional solvent recovering process and apparatus used for the conventional solution casting method and apparatus. Therefore, the film with lower retardation than the conventional film can be produced with the same cost for producing the conventional film.

Although the present invention has been fully described by the way of the preferred embodiments thereof with reference to the accompanying drawings, various changes and modifications will be apparent to those having skill in this field. Therefore, unless otherwise these changes and modifications depart from the scope of the present invention, they should be construed as included therein.

What is claimed is:

1. A method for removing a high-melting point compound from a gas in which compounds having different melting points are mixed, said removing method comprising steps of:
   lowering a melting point MP1 of said high-melting point compound by adjusting a mixing ratio of said high-melting point compound and a low-melting point compound;
   preparing a cleaning liquid having a temperature higher than the lowered melting point; and
   contacting said cleaning liquid to said high-melting point compound in said gas, wherein said high melting-point compound is a retardation reducing agent for reducing a retardation of a polymer film.

2. The removing method claimed in claim 1, wherein a mixture ratio of said low-melting point compound included in said gas is adjusted in a range of 30 wt. % to 50 wt. % so as to lower the melting point MP1 of said high-melting point compound.

3. The removing method claimed in claim 1, wherein said gas is mixture of after-drying air and air including said low-melting point compound, said after-drying air is generated by drying a wet film including a polymer which is a material of a film, a solvent which dissolves said polymer, and said high-melting point compound,
   and wherein said high-melting point compound is a precipitation precipitated by cooling of said after-drying air or said gas.

4. The removing claimed in claim 1, wherein said cleaning liquid is water.

5. The removing method claimed in claim 3, wherein said high-melting point compound is a retardation reducing agent for reducing a retardation of said film.

6. The removing method claimed in claim 1, wherein said high-melting point compound is N-phenyl-p-toluenesulfamide, and
   wherein said low-melting point compound is diphenoxy phosphoryl oxybenzene, bis(2-Ethylhexyl)phthalate, cresyl diphenyl phosphate, or biphenyl diphenyl phosphate.

7. A solvent recovering method comprising steps of:
   removing said high-melting point compound with use of said removing method claimed in claim 3;
   cooling residual air after said contact to remove said low-melting point compound; and
   applying absorbing process to residual air after said cooling to recover said solvent.

8. The solvent recovering method claimed in claim 7, wherein said residual air after said solvent recovering is used as before-drying air for drying said wet film.

* * * * *